United States Patent
Jungnitz et al.

(12)

(10) Patent No.: US 6,573,002 B1
(45) Date of Patent: Jun. 3, 2003

(54) PURIFICATION OF BATTERY ELECTROLYTES BY MEANS OF CHEMICAL ADSORPTION

(75) Inventors: Michael Jungnitz, Frankfurt (DE); Holger Wiederhold, Langen (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 09/719,942

(22) PCT Filed: Jun. 8, 1999

(86) PCT No.: PCT/EP99/03937

§ 371 (c)(1),
(2), (4) Date: Feb. 23, 2001

(87) PCT Pub. No.: WO99/67843

PCT Pub. Date: Dec. 29, 1999

(30) Foreign Application Priority Data

Jun. 20, 1998 (DE) .......................................... 198 27 630

(51) Int. Cl.$^7$ ................................................. H01M 6/04
(52) U.S. Cl. ........................ 429/189; 429/326; 429/330; 429/332; 429/333
(58) Field of Search ................................ 429/189, 326, 429/330, 332, 333

(56) References Cited

U.S. PATENT DOCUMENTS 4,810,266 A  3/1989 Zinnen et al. ................. 55/68

5,849,429 A * 12/1998 Sazhin et al. ................ 429/188
6,045,945 A *  4/2000 Hamamoto et al. ......... 429/200

FOREIGN PATENT DOCUMENTS

DE   4120942   1/1993
EP   075132    3/1983

OTHER PUBLICATIONS

Patent Abstracts of Japan, vol. 008 , No. 194 , (Sep. 6, 1984) & JP59081869(May 11, 1984).

Patent Abstracts of Japan, vol. 010 , No. 192 , (Jul. 5, 1986) & JP610039464(Feb. 25, 1986).

Patent Abstracts of Japan, vol. 011 , No. 69 , (Mar. 3, 1987) & JP61227820(Oct. 9, 1986).

Patent Abstracts of Japan, vol. 016 , No. 024 , (Jan. 22, 1992) & JP03 238004 (Oct. 23, 1991).

Patent Abstracts of Japan, vol. 095 , No. 004 , (May 31, 1995) & JP07 000815(Jan. 6, 1995).

* cited by examiner

*Primary Examiner*—Laura Weiner
(74) *Attorney, Agent, or Firm*—Millen, White, Zelano & Branigan, P.C.

(57) ABSTRACT

The present invention relates to the removal of protic impurities from battery electrolytes which are suitable for lithium cells by chemical adsorption.

14 Claims, No Drawings

PURIFICATION OF BATTERY ELECTROLYTES BY MEANS OF CHEMICAL ADSORPTION

The present invention relates to a method of removing protic impurities from battery electrolytes by means of chemical adsorption.

In the lithium batteries customarily employed (secondary and primary battery cells), use is generally made of electrolytes which consist of electrolyte salts such as $LiPF_6$, $LiBF_4$, $LiAsF_6$, lithium methides, lithium imides or lithium triflates and a mixture of solvents, mainly organic carbonates such as propylene carbonate, ethylene carbonate or butylene carbonate, ethers such as dimethyl ether and propionates such as methyl propionate or ethyl propionate.

These electrolyte solutions normally comprise, despite the high purity of the individual components, protic impurities such as water, alcohols, peroxides. However, the electrolyte salts in the electrolyte solutions are extremely sensitive to these impurities and decompose, for example, to HF, LiF, $POF_3$ or $P_xO_yF_z$, and to various oxofluorophosphoric acids ($R_aP_bO_cF_d$).

These decomposition products are very damaging to the battery cells since they attack the cell components, i.e. cathode and anode, and have a tremendous influence on the covering layer formation on the electrodes. This significantly shortens the life of a battery.

Since HF in particular is very aggressive in this respect, it is necessary to reduce the HF content of the electrolyte mixtures, which is normally 50–80 ppm, substantially. For most applications, an HF content of less than 30 ppm is desired.

The water content of the electrolyte mixture should, if possible, likewise be very low so that these decomposition products cannot occur at all to the previous extent. A very low water content (e.g. less than 20 ppm) is therefore desirable. The methods previously employed for reducing the water content in conventional ways are not effective enough.

The Canadian patent application 2,193,119 describes a method in which the acidic impurities are separated off by means of hydrogen-free chlorides, bromides or iodides. However, this method is also not optimal, since the reaction products formed, viz. HCl, HBr and HI, are still present in the electrolyte mixtures during and to a small extent even after the removal by distillation and can therefore trigger further reactions.

Furthermore, it has been proposed in the literature (J. Electrochem. Soc. Vol. 143, No. 12, 3809–3819, 1996) that HF be neutralized using a base such as tributylamine. However, the reaction products of HF with tributylamine remain in the electrolyte, which is a great disadvantage. It has been confirmed that this reduces the cycling efficiency.

It is therefore an object of the present invention to find a method of removing protic impurities, in particular water or HF, which is simple, quick and effective to carry out and which can reduce the content of water and HF to less than 30 ppm.

It has now been found that fixing the basic group on a support enables the disadvantages described to be avoided and makes it possible to carry out the removal of the protic impurities from battery solvents simply and very effectively by means of chemical adsorption.

The invention accordingly provides a method of purifying electrolyte solutions for lithium cells, characterized by the following steps:

a) adding a base fixed on a support material (adsorbent) which chemically adsorbs the protic impurities, and b) separating off the adsorbent.

The electrolyte solutions according to the invention consist essentially of electrolyte salts such as $LiPF_6$, $LiBF_4$, $LiAsF_6$, lithium methides, lithium imides or lithium triflates, preferably from 0.7 to 1.8 mol/l, and solvent mixtures selected from among the organic solvents organic carbonates such as propylene carbonate, ethylene carbonate, butylene carbonate, dimethyl carbonate, diethyl carbonate, ethyl methyl carbonate, methyl propyl carbonate, ethyl propyl carbonate and further organic carbonates and propionates such as methyl propionate or ethyl propionate, formates such as ethyl formate or methyl formate, acetates such as methyl acetate, ethyl acetate, halogenated carbonates such as chlorinated ethylene carbonate, fluorinated ethylene carbonate, fluorinated propylene carbonate or fluorinated ethylene carbonate and also ethers such as dimethoxyethane.

Suitable adsorbents are generally all those which comprise basic groups bound to a support and can thds chemically adsorb and thds neutralize the protic impurities.

Basic groups used are preferably amino groups, in particular primary amino groups. As support, preference is given to using silicon dioxide, polystyrene or other plastics.

In particularly preferred embodiments of the present invention, the basic groups selected are, for example, $-NH_2$ groups which are bound to a silicon dioxide matrix via propylene groups. This product is commercially available as Lichroprep® $-NH_2$.

Preference is also given to using Amberlite resins having $-NH_2$ groups fixed thereto.

The purification according to the invention can be carried out in various ways.

The first possibility is to finish mixing the electrolyte solution and then to add the adsorbent for separating off the protic impurities and subsequently separating it off again.

In the second possibility, the solvents required for the electrolyte solution are first mixed and the adsorbent is then added. After adsorption is complete, the adsorbent is separated off again and only then is the electrolyte salt mixed in.

The adsorbent can, as one alternative, be introduced into the respective mixture while stirring and subsequently be separated off again by filtration. The reaction time can be chosen freely, but it is preferably kept as short as possible; on the bass of experience, brief stirring for up to 10 minutes is sufficient for the adsorption to be complete.

Another alternative is to introduce the adsorbent into a column. The solution to be purified is, as is customary, passed through the column of adsorbent by means of a pump.

The adsorbent has to be free of water; it is preferably dried well before use. Preferably, it is dried at about 100° C. under reduced pressure for a few days, cooled and subsequently stored with exclusion of moisture or, better, used immediately.

Preference is given to adding from 0.2 to 3% by weight of adsorbent to the electrolyte solutions to be purified. Particular preference is given to an adsorbent content of from 0.4 to 1% by weight.

The adsorbent is separated off by filtration or the like. These conventional methods are known to those skilled in the art.

This gives purified electrolyte solutions which meet the demanding requirements for a low water and HF content. The battery solvents purified according to the invention have values for the water and HF content of less than 20 ppm.

The electrolyte solutions of the invention therefore display improved properties such as higher cycling efficiency and longer life when used in lithium-ion and lithium batteries.

The invention thds also provides electrolyte solutions which are suitable for lithium cells (primary or secondary), which are characterized in that they have been purified by the method described here.

It is assumed that a person skilled in the art can utilize the above description in its fullest scope even without provision of further details. The preferred embodiments are therefore to be interpreted only as a descriptive and in no way limiting disclosure.

The complete disclosure of all applications, patents and publications mentioned above and below are incorporated by reference into the present application.

The following examples illustrate the invention.

Example 1

Lichroprep—$NH_2$ is dried at 100° C. under reduced pressure for 4 days.

The electrolyte solution is prepared as follows:

440 g of ethylene carbonate and 440 g of dimethyl carbonate are mixed and cooled to 10° C. 120 g of $LiPF_6$ are then added and mixed in by stirring.

1000 ml of electrolyte are admixed with 4 g of adsorbent and stirred briefly. The adsorbent is then immediately filtered off with suction.

The HF and $H_2O$ content after the treatment is in each case <10 ppm.

Example 2

$Al_2O_3$ is dried as in Example 1 and stored.

The solvents for the electrolyte, viz. 440 g of ethylene carbonate and 440 g of dimethyl carbonate, are mixed and 10 g of dried $Al_2O_3$ are added thereto, the mixture is stirred for 10 minutes and the adsorbent is filtered off again.

The solvent mixture is then cooled to 10° C. and 120 g of $LiPF_6$ are added while stirring.

The HF and $H_2O$ content after the treatment is in each case <20 ppm.

Example 3

$Al_2O_3$ is dried as described in Example 1 and stored.

The adsorbent is then introduced into a column.

The electrolyte solution is prepared as follows: 440 g of ethylene carbonate and 440 g of dimethyl carbonate are mixed and cooled to 10° C. 120 g of $LiPF_6$ are added and mixed in by stirring. The electrolyte obtained in this way contains 60 ppm of HF. This electrolyte is pumped through the above adsorbent column by means of a pump. The purified electrolyte contains less than 10ppm of HF and $H_2O$.

What is claimed is:

1. A method for purifying an electrolyte solution comprising
    a) adding an adsorbent that has a support material to which basic groups are bound to an electrolyte solution that contains protic impurities whereby the protic impurities chemically adsorb to the adsorbent, and separating the adsorbent from the electrolyte solution, or
    b) adding an adsorbent that has a support material to which basic groups are bound to one or more solvents that contain protic impurities whereby the protic impurities chemically adsorb to the adsorbent, separating the adsorbent from the one or more solvents, and adding one or more electrolyte salts to the one or more solvents to form an electrolyte solution, or
    c) placing an adsorbent that has a support material to which basic groups are bound into a column and passing an electrolyte solution that contains protic impurities through the column whereby the protic impurities chemically adsorb to the adsorbent, or
    d) placing an adsorbent that has a support material to which basic groups are bound into a column and passing one or more solvents that contain protic impurities through the column whereby the protic impurities chemically adsorb to the adsorbent, and adding one or more electrolyte salts to the one or more solvents to form an electrolyte solution.

2. A method according to claim 1, wherein the support material is silicon dioxide, polystyrene or a plastic other than polystyrene.

3. A method according to claim 1, wherein the basic groups contain one or more —$NH_2$ groups that are bound to the support material that is a silicone dioxide matrix via propylene groups.

4. A method according to claim 1, wherein 0.2 to 3% by weight of adsorbent is added to the electrolyte solution.

5. A method according to claim 1, wherein 0.4 to 1% by weight of adsorbent is added to the electrolyte solution.

6. A method according to claim 1, wherein the adsorbent is free of water.

7. A method according to claim 1, wherein the protic impurities are water and/or HF.

8. A method according to claim 1, wherein separating the adsorbent from the electrolyte solution or from the one or more solvents is by filtration.

9. An electrolyte solution suitable for use in a lithium cell, wherein said solution has been purified by a method of claim 1 and contains less than 10 ppm of water and less than 10 ppm of HF.

10. An electrolyte solution according to claim 9 that comprises one or more organic carbonates and/or one or more propionates and/or one or more formates and/or one or more acetates and/or one or more halogenated carbonates and/or one or more ethers.

11. An electrolyte solution according to claim 9 that comprises, one or more organic carbonates selected from the group consisting of propylene carbonate, ethylene carbonate, butylene carbonate, dimethyl carbonate, diethyl carbonate, ethyl methyl carbonate, methyl propyl carbonate and ethyl propyl carbonate, and/or one or more propionates selected from the group consisting of methyl propionate and ethyl propionate, and/or one or more formates selected from the group consisting of ethyl formate and methyl formate, and/or one or more acetates selected from the group consisting of methyl acetate and ethyl acetate, and/or one or more halogenated carbonates selected from the group consisting of chlorinated ethylene carbonate, fluorinated ethylene carbonate and fluorinated propylene carbonate, and/or dimethoxyethane.

12. An electrolyte solution according to claim 9 that comprises $LiPF_6$, $LiBF_4$, $LiAsF_6$, lithium methide, lithium imide or lithium triflate.

13. A lithium cell containing an electrolyte solution that has been purified by a method of claim 1, wherein the electrolyte solution contains less than 10 ppm of water and less than 10 ppm of HF.

14. A lithium-ion or lithium battery containing an electrolyte solution that has been purified by a method of claim 1, wherein the electrolyte solution contains less than 10 ppm of water and less than 10 ppm of HF.

* * * * *